:::

United States Patent [19]
Jablonski et al.

[11] Patent Number: 5,554,977
[45] Date of Patent: Sep. 10, 1996

[54] REMOTE CONTROLLED SECURITY SYSTEM

[75] Inventors: Gary F. Jablonski, Ypsilanti; Henry J. Ewald, Livonia, both of Mich.

[73] Assignee: Ford Motor Company, Dearborn, Mich.

[21] Appl. No.: 430,104

[22] Filed: Apr. 27, 1995

Related U.S. Application Data

[63] Continuation of Ser. No. 1,696, Jan. 7, 1993, abandoned.

[51] Int. Cl.⁶ .............................. G06F 7/04; G06F 7/58; G08C 19/00; B60R 25/00
[52] U.S. Cl. .............................. 340/825.310; 340/825.34; 340/825.69; 307/10.2
[58] Field of Search ..................... 340/825.31, 825.34, 340/825.69, 825.72, 426; 307/10.1, 10.2, 10.3

[56] References Cited

U.S. PATENT DOCUMENTS

| | | |
|---|---|---|
| 4,437,153 | 3/1984 | Kamiyama et al. . |
| 4,509,093 | 4/1985 | Stellberger . |
| 4,596,985 | 6/1986 | Bongard et al. . |
| 4,686,529 | 8/1987 | Kleefeldt .......................... 340/825.69 |
| 4,723,121 | 2/1988 | van den Boom et al. ............ 307/10.2 |
| 4,733,215 | 3/1988 | Memmola ............................. 340/426 |
| 4,758,835 | 7/1988 | Rathmann et al. . |
| 4,825,210 | 4/1989 | Bachhuber et al. . |
| 4,847,614 | 7/1989 | Keller . |
| 4,926,332 | 5/1990 | Komuro et al. . |
| 4,928,098 | 5/1990 | Dannhaeuser . |
| 5,107,258 | 4/1992 | Soum .................................. 340/825.31 |
| 5,144,667 | 9/1992 | Pogue, Jr. et al. . |
| 5,159,329 | 10/1992 | Lindmayer et al. . |
| 5,191,610 | 3/1993 | Hill et al. . |
| 5,369,706 | 11/1994 | Latka .................................. 340/825.69 |
| 5,412,379 | 5/1995 | Waraksa et al. .................... 340/825.31 |
| 5,508,692 | 4/1996 | Wolfram ............................. 340/825.31 |
| 5,517,187 | 5/1996 | Bruwer et al. ...................... 340/825.31 |

FOREIGN PATENT DOCUMENTS

| | | |
|---|---|---|
| 0244332 | 11/1987 | European Pat. Off. . |
| 0459781A1 | 12/1991 | European Pat. Off. . |
| 2606232 | 5/1988 | France . |

Primary Examiner—Eric Coleman
Assistant Examiner—Mark H. Rinehart
Attorney, Agent, or Firm—Kevin G. Mierzwa

[57] ABSTRACT

A security system and method is provided for one way communication between a remote transmitter and a receiver which enables a function such unlocking the doors or disarming a security system. The system uses a three part security code having one part which is a pseudo-randomly generated function, one part which is a permanently assigned code to the transmitter/receiver combination and one part which is based on the number of transmissions transmitted by the transmitter.

5 Claims, 2 Drawing Sheets

REMOTE CONTROLLED SECURITY SYSTEM

This is a continuation of application Ser. No. 08/001,696 filed Jan. 7, 1993 now abandoned.

BACKGROUND OF THE INVENTION

The present invention relates generally to a remote controlled security system and in particular to a security system using synchronized one-way transmissions wherein synchronization is maintained between the transmitter and receiver even after inadvertent activations of the transmitter.

Many security systems are available where a pushbutton remote transmitter enables a function in the vehicle such as unlocking the doors or turning off an alarm. Such systems may have the remote control unit emit a fixed identification code exclusive to the transmitter/receiver combination. However, a security system using a fixed code can be defeated by using a random scanning device which transmits random codes in rapid succession in hopes of reproducing a valid code. Security is increased in such a system by increasing the number of combinations in the security code, i.e., increasing its length.

The fixed code system can also be defeated using a recording device which captures and then duplicates transmissions of the security code from a valid transmitter.

Other security systems are known which use a security code that changes after each transmission, thereby eliminating the possibility of a transmission being recorded and retransmitted because an exact duplicate of the previously transmitted signal will be accepted by the receiver.

One known method of changing the security code uses a look-up table in both the transmitter and receiver which is indexed every time a transmission is made. One problem with such a system is that if the transmitter is operated outside the receiver range, the transmitter will no longer be synchronized with the receiver and will be unable to control the system. To alleviate this synchronization problem, two-way transmissions using a "handshaking" technique have been used to ensure that the transmitter and receiver are indexed simultaneously. However, the need to have both a transmitting and a receiving capabilities in the remote control unit and the in-vehicle apparatus is undesirable.

A security system described in U.S. Pat. No. 4,847,614 employs a one-way transmission method. A digital code is stored in the system memory and is changed in both the transmitter and receiver by using digital logic gates to operate on the bits to produce the next code of the sequence after each transmission. This system also suffers from synchronization problems which if severe enough, will result in the operator using a key to manually unlock the door. If the system is less than 10 steps out of sink, the system automatically resynchronizes itself. If the system is between 10 and 256 steps out of sink, two successive transmissions must be made. This situation would happen quite frequently resulting in a perception of poor performance from the customer. Furthermore, after changing the transmitter battery, the transmitter will have lost synchronization.

The security system described in U.S. Pat. No. 5,159,329 uses a security code portion which has a fixed portion and a portion which varies according to a specified algorithm. The system advances the alterable portion of the code word after each transmission. The problem with such a system is that once the transmitter is activated outside the range of the control device the transmitter and control device are then out of synchronization. The system can be reset by the use of a mechanical switch inside the vehicle. This situation would happen quite frequently and would be perceived as poor performance by the customer.

It would be desirable to have a remote control system using one-way transmissions and a rolling code that is not dependent on the synchronization of the transmitter and receiver.

SUMMARY OF THE INVENTION

It is therefore an object of the invention to provide a system with a rolling code not dependent on synchronization.

The present invention uses one-way transmissions between the transmitter and receiver and does not rely solely on transmission of a predetermined code stored in memory. Rather, pursuant to each new transmission, a security code is formed having three portions including a rolling code which is not dependent on the last transmitted security code. More specifically, the transmitter has a counting means for providing a count of the number of transmissions made by the transmitter, a first storing means for storing an identification code assigned to the transmitter, and a first calculating means for calculating a first rolling code using a predetermined formula. The transmitter further includes a transmitting means for transmitting a security code having an identification code portion, a transmission count portion, and a rolling code portion. The receiver includes a receiving means for receiving the security code and reproducing the identification code portion, the transmission count portion and the rolling code portion. The receiver further includes a second storing means for storing the identification code, a third storing means for storing the last transmission count received from the transmitter, a second means for calculating a second rolling code using the same predetermined formula, a first comparing means for comparing the identification code portion with the identification, a second comparing means for comparing the rolling code portion with the second rolling code, and a third comparing means for comparing the transmission count portion with the last transmission count.

DETAILED DESCRIPTION OF THE INVENTION

Figure 1:
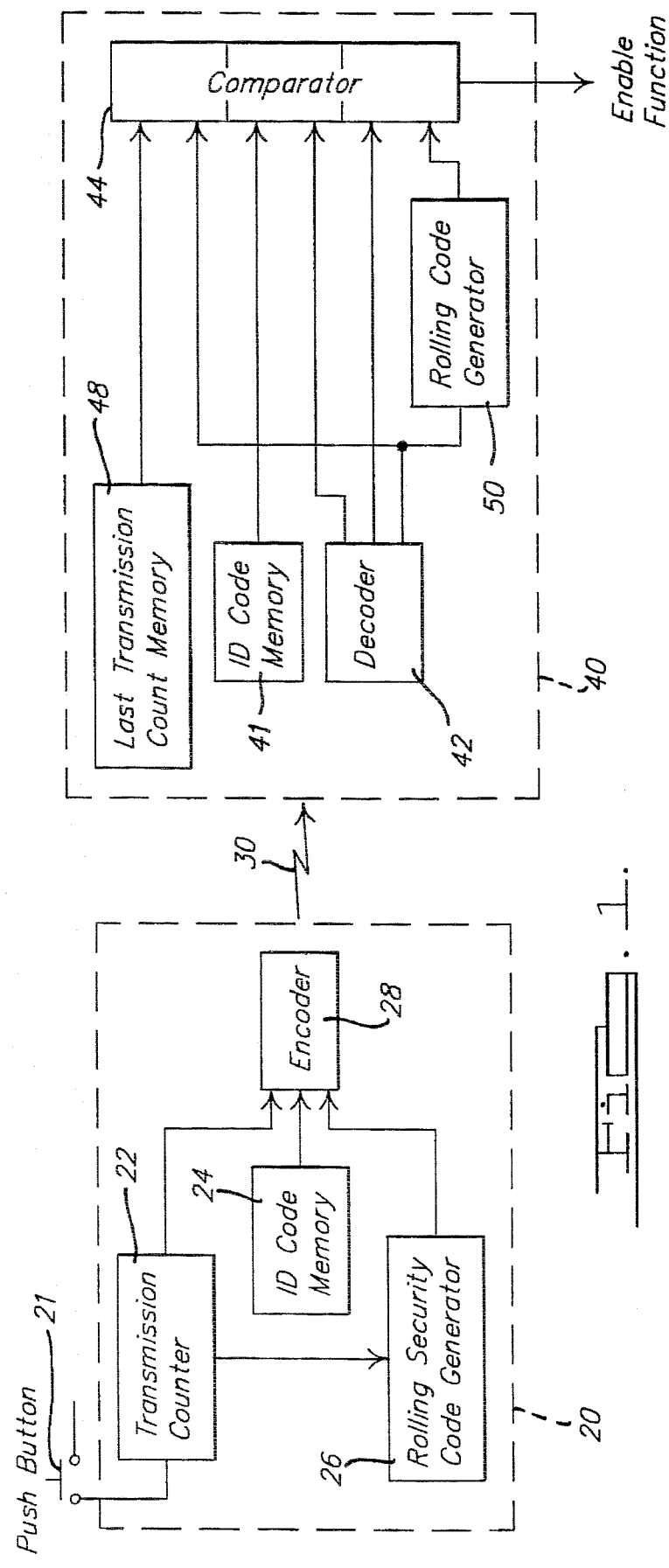
FIG. 1 is a block diagram showing the apparatus of a preferred embodiment of the present invention.

Referring now to FIG. 1, a transmitter 20 is provided to send a security code to a receiver 40 which enables a function such as unlocking a door or disabling an alarm. The one-way signal 30 transmitted by transmitter 20 can be a radio frequency or infrared transmission, for example, using known apparatus for transmitting digital information.

When the user wants a function to be activated, the security code is activated causing the security code to be activated. Transmitter 20 has a transmission counter 22 which stores and updates the number of transmissions (i.e. button activations) made by transmitter 20. Transmission counter 22 stores the value in volatile memory which is cleared if the transmitter battery (not shown) is removed.

Transmitter 20 also has an identification code memory 24 which stores a fixed identification code assigned to the transmitter and receiver. The identification code is held in nonvolatile memory (e.g. ROM) so it is not erased if power to transmitter 20 is interrupted.

Transmitter 20 also has a rolling code generator 26 which calculates a non-repetitive rolling code based on the transmission count value. The calculation preferably employs a linear congruential method of generating random numbers, such as is described in "The Art of Computer Programming, Vol. 2, Semi-Numerical Algorithms" by Donald E. Knuth. The rolling code is calculated in response to activation of push button 21. A preferred formula used for calculating the rolling code is as follows:

Rolling code=((a * Transmission Counter)+c) mod m where "a" is selected such that:
If "m" is a power of 2, pick "a" so that (a mod 8)=5
If "m" is a power of 10, choose "a" so that (a mod 200)=21,
"a" is larger than "SQRTm", preferably larger m/100 but, smaller than (m-SQRT m).
"c" can be any number chosen which at least conforms to the following:
"c" is an odd number when "m" is a power of two.
"c" is not a multiple of 5 when "m" is a power of 10.
"m" should be selected such that it is the largest value possible so that the computer word length is not exceeded.

The rolling code is preferably calculated exactly with no round-off error.

The security code is a combination of the values in transmission counter 22, identification code memory 24 and rolling code generator 26. The security code is formed and transmitted by an encoder 28.

Receiver 40 has a decoder 42 which receives the security code generated by transmitter 20 and separates it back into the three distinct portions.

Receiver 40 has an identification code memory 41 with the same value as transmitter 20 stored in nonvolatile memory. Receiver 40 also has a last transmission count memory 48 which stores the last transmission count previously sent by transmitter 20. The value in last transmission count memory 48 is not updated until a valid code is sent and the function of the system is enabled.

When decoder 42 receives the security code, the rolling code generator 50, using the same formula as transmitter 20, calculates the rolling code based on the received transmission count.

If the values received from transmitter 20 correspond to the values generated in receiver 40 in the following manner then comparator 44 generates a signal to enable the designated function: 1) the value in identification code memory 41 must be equal to the identification code received; 2) the value calculated by rolling code generator 50 must be equal to the rolling code value received; and 3) the transmission count value received must be greater than the value in last transmission count memory 48.

Because the transmission count value received from the transmitter need only be greater than the value in last transmission count memory 48, synchronization is not lost if the value in the transmitter counter 22 is incremented while outside the range of receiver 40.

Figure 2:
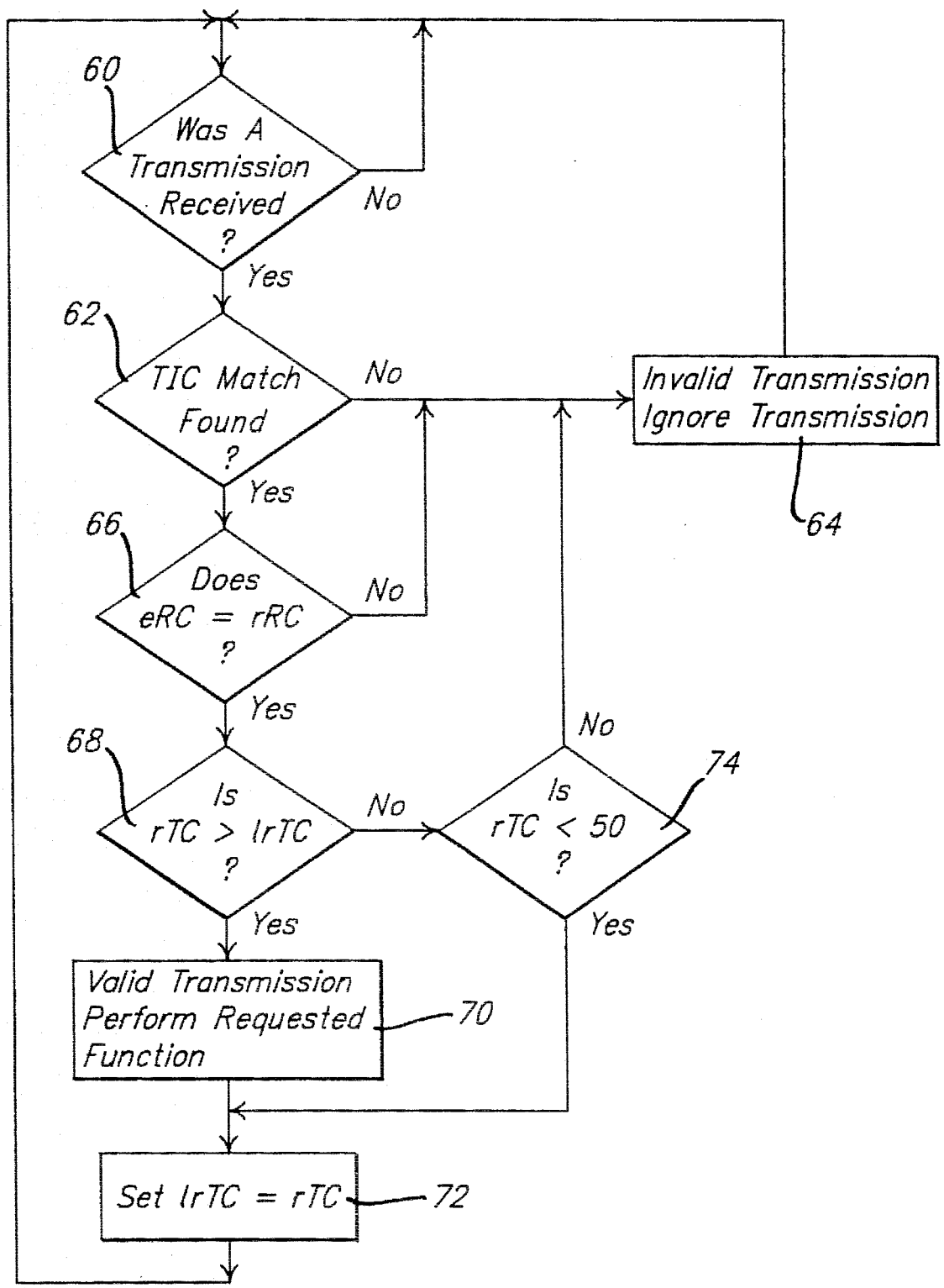
FIG. 2 is a flow chart of a preferred method of operating the remote control system.

Referring now to FIG. 2, a flowchart is shown for the sequence of steps to be executed in the receiver as a preferred method of operating the invention.

The operation sequence is started at step 60 where the receiver waits until a transmission is detected. When a transmission is received, the security code is broken down into its three segments. The system has three separate checks before enabling a function. Step 62 checks to see if the transmitted identification code portion (TIC) is equal to the value stored in the identification code memory of the receiver. If the identification codes are not equal, step 64 is executed which ignores the transmission as invalid and returns to the beginning of the sequence. If the identification codes are equal, step 66 is executed which checks if the expected rolling code (eRC) calculated by the receiver using the received transmission count value is the same as the received rolling code (rRC) calculated in the transmitter using the same mathematical function operating on the transmission count value. If the rolling codes do not match, step 64 is executed where the transmission is ignored as invalid and the sequence starts over again at step 60. If the rolling codes are equal, step 68 is executed which checks whether the received transmission counter (rTC) value is greater than the last received transmission counter value (lrTC) stored in the memory of the receiver. This step is not an equivalence as in the prior art because the transmitter may have been activated outside the range of the receiver and the transmission counter of the transmitter would be higher than that of the receiver. This eliminates the need for exact synchronization of the transmitter and receiver. If the received transmission counter value is greater than the last transmitter value stored in the memory of the transmitter, the transmitted signal is identified as valid and step 70 is executed which performs a function such as opening a door or turning off an alarm system. After a function is enabled in step 70, the received transmission counter value (rTC) is placed in the last received transmission counter (lrTC) value memory of the receiver in step 72.

In the event that the battery in the transmitter is changed, the transmitter memory will be lost and the transmission count value reset to zero. Returning back to step 68, if the received transmission counter value was less than or equal to the last transmission counter value stored in the memory of the receiver, step 74 is executed. Step 74 checks whether the received transmission counter value is less than a predetermined number, such as 50. If the value is 50 or greater, step 64 is executed which ignores the transmission as invalid. If the value is less than 50, step 72 is executed where the received transmission counter value is then placed in the last received transmission counter memory of the receiver. After a battery change, the transmitter can be activated twice in the presence of the receiver in order to reset the receiver transmission count value and then enable the desired function. The number 50 allows for some inadvertent activations after the battery change until the first activation within the range of the receiver.

We claim:

1. A security system comprising;

a transmitter including;

a removable power source;

counting means for providing a count of the number of transmissions made by said transmitter and wherein said counting means has a volatile memory;

first storing means for storing an identification code assigned to said transmitter;

first calculating means for calculating a first rolling code using a predetermined formula; and transmitting means for transmitting a security code having an identification code portion, a transmission count portion, and a rolling code portion; and a receiver including;

receiving means for receiving said security code and reproducing said identification portion, said transmission count portion and said rolling code portion;

second storing means for storing said identification code;

third storing means for storing a last transmission count previously received from said transmitter;

second calculating means for calculating a second rolling code using the same predetermined formula;

first comparing means for comparing said identification code portion with the value in said second storing means;

second comparing means for comparing said rolling code portion with said second rolling code; and third comparing means for comparing said transmission count portion with said last transmission count;

wherein upon removal of said removable power source said volatile memory is cleared and said third storing means is set to the transmission count portion received if said transmission count portion is less than said last transmission count in said third storing means and said transmission count portion is less than a predetermined value.

2. A security system as claimed in claim 1 wherein said removable power source is a battery.

3. A security system as claimed in claim 1 wherein said predetermined value is about 50.

4. A method for activating a security system having a transmitter having a removable battery and a volatile memory storing a transmission count and a receiver having a receiver memory, the method comprising the steps of:

storing a last transmission count in said receiver memory;

removing said battery;

clearing said volatile memory in response to removing said battery;

replacing said battery;

activating a transmitter to emit a security code;

receiving said security code in said receiver;

decoding said security code in said receiver into a received transmission count;

comparing said received transmission count to said last transmission count in said receiver memory; and storing said received transmission count in said receiver memory if said transmitter count is less than a predetermined value and said received transmission count is less than or equal to said last transmission count.

5. A method as claimed in claim 4 further comprising the steps of:

reactivating a transmitter to emit a security code;

incrementing and storing a transmission count in said transmitter;

generating a rolling code value based on a known function in said transmitter;

transmitting a security code having a transmitter identification code portion, transmission count portion, and rolling code value portion;

receiving the security code in said receiver;

verifying the transmitter identification code transmitted is the same as the transmitter identification code stored in the memory of said receiver;

calculating a rolling code in said receiver based on the transmission count received from said transmitter with the same function used in said transmitter;

verifying the transmitted rolling code is equivalent to the rolling code calculated in said receiver;

verifying the transmission count received from said transmitter is greater than the last transmission counter number stored in said receiver;

enabling a function after the transmitter identification code, rolling code, and transmission count have been successfully verified.

* * * * *